Feb. 2, 1954
P. MARTON
2,667,691
GLASS CUTTING MACHINE
Filed Sept. 7, 1951
2 Sheets-Sheet 1
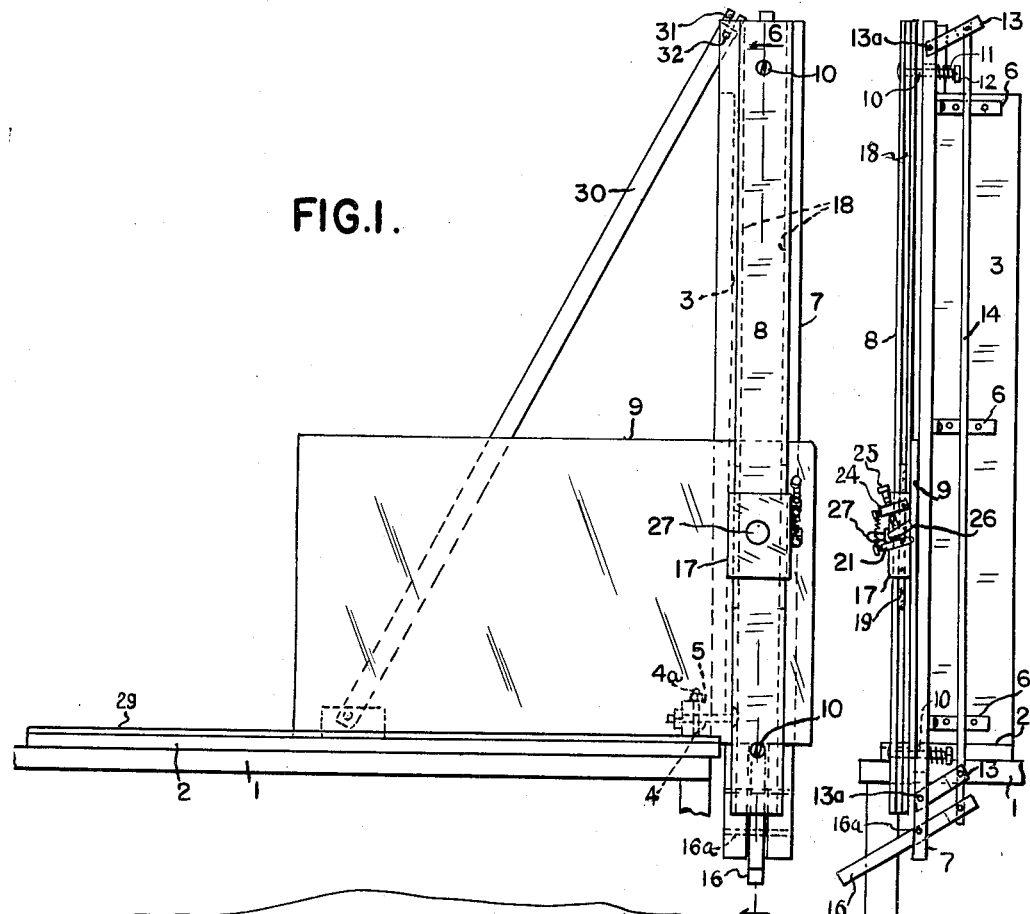
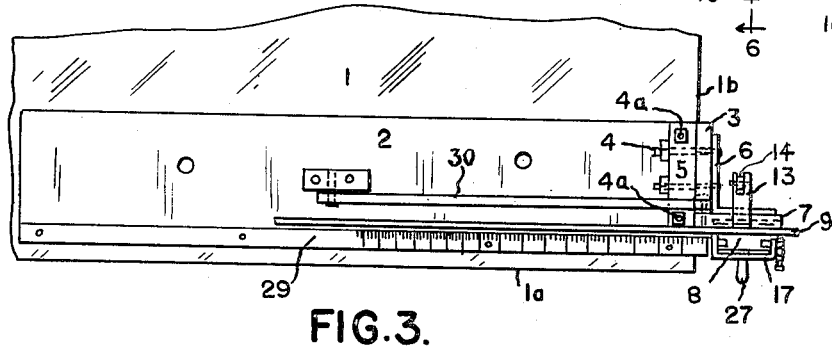
INVENTOR.
PAUL MARTON
BY
*J. S. Murray*
ATTORNEY Feb. 2, 1954 — P. MARTON — 2,667,691
GLASS CUTTING MACHINE
Filed Sept. 7, 1951 — 2 Sheets-Sheet 2
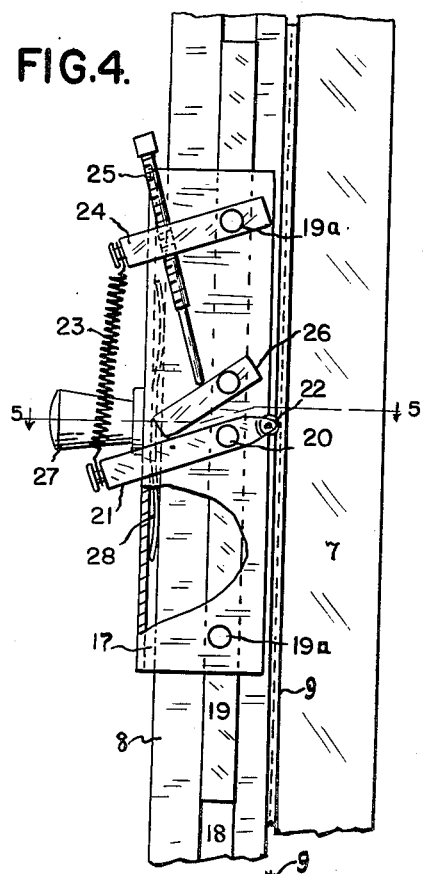
FIG.4.
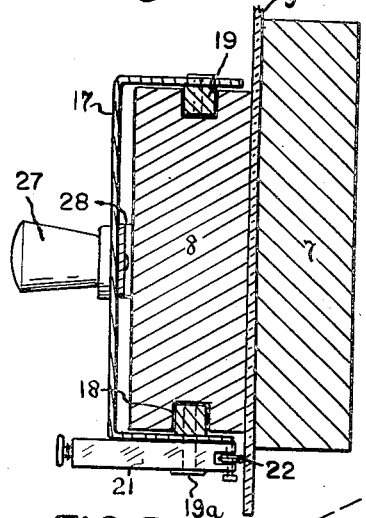
FIG.5.
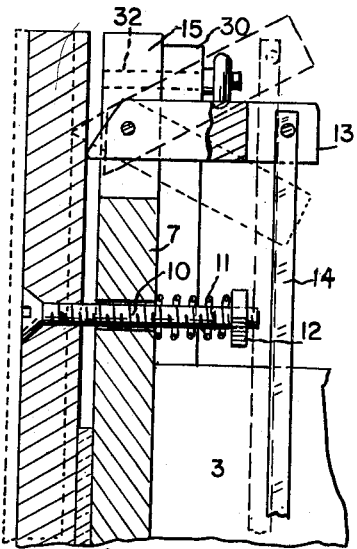
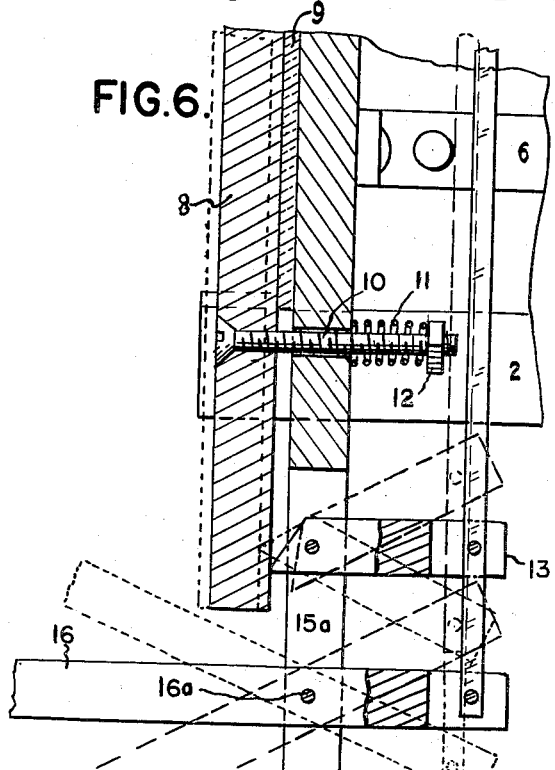
FIG.6.
INVENTOR.
PAUL MARTON
BY
J.S. Murray
ATTORNEY Patented Feb. 2, 1954

2,667,691

UNITED STATES PATENT OFFICE 2,667,691

GLASS CUTTING MACHINE

Paul Marton, Windsor, Ontario, Canada

Application September 7, 1951, Serial No. 245,527

3 Claims. (Cl. 33—32)

This invention relates to glass cutting machines and particularly machines associating provisions for firmly clamping a glass plate and for guiding a cutter in straight-line travel across such plate.

An object of the invention is to provide for clamping a glass plate between two elongated bars, and to utilize one thereof as a slide guide and mounting for a cutter.

Another object is to adapt said bars to engage the glass under a predetermined spring-applied clamping pressure and to provide a simple and inexpensive mechanism for establishing and maintaining a desired clearance between the bars, when glass is to be inserted in or removed from the machine.

Another object is to install a glass cutter on a carriage slidable on and rectilinearly guided by an elongated bar, to subject the cutter to a spring urging the cutting tool against a plate of glass against which said bar is held, and to afford regulation of the spring and hence of pressure applied by said tool to the glass.

Another object is to mount said bar transversely of a base plate or other abutment for an edge of the glass and to afford the bar a slight angular adjustment relative to the base plate so that the glass may be cut, if desired, along a line diverging slightly from a true perpendicular to the base plate.

These and various other objects are attained by the construction hereinafter described and illustrated in the accompanying drawings, wherein:

Fig. 1 is a front elevational view of the machine mounted on a table, showing a plate of glass in process of being cut.

Fig. 2 is a side or edge view of the same.

Fig. 3 is a top plan view of the same.

Fig. 4 is a fragmentary enlarged view of a portion of Fig. 2, particularly showing the glass cutter and its carriage.

Fig. 5 is a cross sectional view of said cutter and carriage, taken on the line 5—5 of Fig. 4.

Fig. 6 is a fragmentary vertical sectional view of the glass clamp and releasing mechanism, the section being taken on the line 6—6 of Fig. 1, and considerably enlarged over Fig. 1.

In these views, the reference character 1 designates a table top or other platform serving as a support for my improved machine. The latter comprises a base plate 2 elongated along one edge 1a of the table and terminally adjoining a relatively transverse edge 1b. Seated on the plate 2 and adjoining the table edge 1b is an upright board 3 fastened by bolts 4 and nuts thereon to block 5 which is in turn bolted, as indicated at 4a to the plate 2. The width of the board 3 is transverse to the length of the base plate and there is rigidly mounted on said board by angle brackets 6, an upright bar 7 whose width is transverse to that of the board, said bar extending downwardly a few inches below the base plate. Parallel with, opposed to, and approximately coextensive with the bar 7 is a second bar 8, the two bars being spaced apart to receive a glass plate 9 therebetween and serving as clamps for such plate. The bar 8 is mounted on the bar 7 by a pair of pins 10 transverse to both bars and fixed in the bar 8 and slidable in the bar 7. Said pins carry coiled springs 11 compressed between the bar 7 and adjusting nuts 12 mounted on the threaded rear ends of the pins. Thus said springs tend to draw the bar 8 toward the bar 7 into clamping engagement with the glass 9, applying a regulable and predetermined clamping pressure, the glass projecting beyond the base plate 2 for engagement by said bars, as best appears in Fig. 1.

To overcome the springs 11 and space the bars 7 and 8 apart for glass insertion or removal, there is provided a mechanism comprising a pair of cam arms 13 pivoted at 13a on the end portions of the bar 7 and interconnected by an elongated substantially vertical link rod 14. The bar 7 has upper and lower slots 15 and 15a in its end portions to receive the arms 13, and a lever 16 pivoted at 16a in the slot 15a serves to actuate the link rod up or down. Said lever projects sufficiently forward from its pivot to provide a handle and afford ample leverage. The arms 13 have diagonal front ends (see Fig. 6), the apices of which bear on the bar 8 to predeterminedly space the bars in a raised position of the lever 16 and which lie substantially parallel to the bar 8 in a lowered position of the lever, allowing the springs 11 to exercise their clamping function.

Vertically slidable on the bar 8 is a carriage 17 preferably formed of sheet-metal and bent to an approximate U-form so as to straddle the bar 8. The latter has a pair of grooves 18 opening in its vertical edges and extending from end to end thereof, such grooves receiving elongated guide rails 19 fixed by rivets 19a upon and within the carriage. As illustrated, said rails extend some distance above and below the carriage. Pivoted on the carriage at one side thereof by a pin 20 is a glass cutter 21 of a lever nature having a short rearwardly projecting arm mounting a cutter wheel 22 or other glass cutting tool. Said cutter has a relatively long forwardly projecting arm which is terminally engaged by a coiled tension spring 23 upwardly extending to an anchorage arm 24 pivoted on the upper rivet 19a, and forwardly projecting from such rivet. An adjusting screw 25 threaded in the arm 24 extends downwardly from the latter to terminally bear upon an abutment block 26 fixed on the carriage. Thus by rotating said screw the arm 24 may be swung up or down to increase or decrease tension of the spring 23. The described arrangement is such that the spring holds the cutter 21 pulled upwardly against the block 26 when no glass engages the cutter wheel, as when the carriage is raised to overlie the glass plate 9. As the carriage is lowered, the wheel 22 rides on the glass, the latter swinging the cutter 21 slightly counterclockwise so that it clears the block 26. This condition is maintained throughout downward actuation of the carriage from top to bottom of the glass, the pressure under which the wheel 22 bears on the glass being determined by the spring 23. The carriage centrally carries a forwardly projecting handle 27 by which it may be slid up and down and a bow spring 28 interiorly carried by the carriage bears on the front face of the bar 8 to yieldably retain the carriage at a desired elevation.

The described regulation of the pressure under which the cutter wheel bears on the glass is of great importance, since this determines the depth of the scratch applied by the wheel to the glass. If such scratch is too deep, undue wear is imposed on the wheel and the glass will not break cleanly. If the scratch is too shallow, there will be undue resistance to breaking and the break may not follow the scratch. Said regulation is of further importance since thick glass requires a materially deeper scratch than thin glass. When the spring 23 is once properly tensioned for cutting glass of a certain thickness, no further regulation of such spring is necessary unless there is a change in the glass thickness.

A measuring stick 29 may be fixed on the base plate 2 along the front margin of said plate to facilitate determination of a width of a pane to be cut from the glass 9.

A strut or brace bar 30 diagonally extends from the base plate 2 to the upper end of the bar 7, normally holding the upright elements 3, 7 and 8 of the machine exactly perpendicular to the baseplate. The upper end portion of the strut 30 however is slotted lengthwise at 31 to receive a thumb screw 32 set into the bar 7, the slot 31 being long enough to provide for a slight lateral tilting of the parts 3, 7 and 8, in case it is desired to cut glass at a slight divergency from a rectangular relation to the lower edge of the glass. When such divergency is desired, the screws 4 or 4a or both sets thereof may be loosened slightly to allow the requisite slight relative play between the base plate and upright parts.

The described machine is desirably simple and inexpensive, and its larger parts may be formed of wood. While the machine, as illustrated, is disposed for cutting an upright plate of glass, it is evident that the mechanism shown may be readily adapted to operate on a horizontally disposed glass plate.

What I claim is:

1. In a glass cutting machine, an elongated guide bar engageable with one side of a glass plate, a carriage slidable upon and along said bar, a glass cutter pivotal on the carriage and including a cutting tool engageable with the glass plate by pivotal actuation of the cutter, a coiled spring on the carriage urging the cutter in a direction to engage the tool with the glass plate, said spring being tensionally effective at one of its ends on the cutter, an anchorage member for the other end of said spring, means pivoting the anchorage member on the carriage for varying the spring tension, and an adjusting screw regulating the pivotal position of the anchorage member.

2. In a glass cutting machine, an elongated guide bar engageable with one side of a glass plate, a carriage slidable upon and along said bar, a glass cutter pivotal on the carriage and including a cutting tool engageable with the glass plate by pivotal actuation of the cutter, a coiled spring on the carriage tensionally effective on the cutter at one end of such spring to engage the cutting tool with the glass plate, an anchorage member for the other end of the spring, means pivoting the anchorage member on the carriage for varying the spring tension, an abutment fixed on the carriage and engageable by the cutter to limit response of the cutter to the spring in absence of said glass plate, and means reacting between said anchorage member and abutment to regulate the pivotal position of the anchorage member.

3. In a machine for cutting sheet material, a pair of elongated parallel bars for oppositely clamping such material, a plurality of pins fixed on one of said bars and extending slidably through the other bar to maintain the opposed relation of the bars, springs mounted on said pins and urging the bars toward each other to apply clamping pressure to the material, a pair of cam arms pivoted on and spaced longitudinally of one of said bars and having cam extremities effective through rocking of said arms to increase the spaced relation of the bars and relieve clamping pressure on the material, a link rod interconnecting the other extremities of the cam arms, and a lever pivoted on the bar pivoting the cam arms and effective on the link rod to rock the cam arms.

PAUL MARTON.

References Cited in the file of this patent

UNITED STATES PATENTS

| Number | Name | Date |
|---|---|---|
| 453,867 | Monce | June 9, 1891 |
| 662,924 | Dugon | Dec. 4, 1900 |
| 1,100,878 | Higgins et al. | June 23, 1914 |
| 1,115,333 | Pease | Oct. 27, 1914 |
| 1,885,099 | Hively et al. | Oct. 25, 1932 |
| 2,174,183 | Shaw | Sept. 26, 1939 |
| 2,357,206 | Klages | Aug. 29, 1944 |
| 2,460,842 | Murphy et al. | Feb. 8, 1949 |
| 2,531,149 | Melchor | Nov. 21, 1950 |
| 2,534,775 | Judd | Dec. 19, 1950 |
| 2,538,901 | Fancher | Jan. 23, 1951 |